(12) United States Patent
Steckl et al.

(10) Patent No.: US 7,872,790 B2
(45) Date of Patent: Jan. 18, 2011

(54) DISPLAY CAPABLE ELECTROWETTING LIGHT VALVE

(75) Inventors: Andrew J. Steckl, Cincinnati, OH (US); Jason C. Heikenfeld, New Richmond, OH (US)

(73) Assignee: University of Cincinnati, Cincinnati, OH (US)

( * ) Notice: Subject to any disclaimer, the term of this patent is extended or adjusted under 35 U.S.C. 154(b) by 879 days.

(21) Appl. No.: 11/570,920

(22) PCT Filed: Jul. 8, 2005

(86) PCT No.: PCT/US2005/024145

§ 371 (c)(1), (2), (4) Date: Dec. 19, 2006

(87) PCT Pub. No.: WO2006/017129

PCT Pub. Date: Feb. 16, 2006

(65) Prior Publication Data

US 2008/0297880 A1    Dec. 4, 2008

Related U.S. Application Data

(60) Provisional application No. 60/586,555, filed on Jul. 9, 2004.

(51) Int. Cl.
 *G02F 1/07* (2006.01)
(52) U.S. Cl. ...................................................... 359/253
(58) Field of Classification Search .................. 359/296, 359/253, 320, 228
See application file for complete search history.

(56) References Cited

U.S. PATENT DOCUMENTS

| | | | |
|---|---|---|---|
| 5,835,255 A | 11/1998 | Miles | |
| 6,650,455 B2 | 11/2003 | Miles | |
| 6,702,483 B2 | 3/2004 | Tsuboi et al. | |
| 6,961,167 B2 * | 11/2005 | Prins et al. | 359/253 |
| 6,967,763 B2 * | 11/2005 | Fujii et al. | 359/297 |
| 2004/0061816 A1 | 4/2004 | Tsuchiya et al. | |

FOREIGN PATENT DOCUMENTS

EP    1279996 A2    1/2003

OTHER PUBLICATIONS

International Searching Authority, International Search Report issued in corresponding PCT Application serial No. PCT/US2005/24145 dated Jul. 18, 2006.
Miles, et al., Digital Paper for Reflective Displays, Journal of the SID Nov. 1, 2003, pp. 209-215.
Roques-Carmes Thibault, et al., "Liquid behavior inside a reflective display pixel based on electrowetting", Journal of Applied Physics, American Institiute of Physics, New York, vol. 95, No. 8, Apr. 15, 2004.
Hayes, R A et al., "Video-speed electronic paper based on electrowetting" Nature, Nature Publishing Group, London, vol. 425, No. 6956, Sep. 25, 2003, pp. 383-385.
Feenstra B J et al., "1-in Active Matrix Addressed Electrowetting Displays", IDW, EP2-1 Invited, London, Jan. 1, 2004, pp. 1717-1720.
European Patent Office, extended European search report issued in related European application serial No. 05769337.6 dated Sep. 29, 2009.

* cited by examiner

*Primary Examiner*—Joseph Martinez
(74) *Attorney, Agent, or Firm*—Wood, Herron & Evans, LLP (57) ABSTRACT

The invention relates to light transmissive, transflective, or reflective flat panel display devices and, more specifically, to light emissive flat panel displays constructed from high performance electrowetting light valve (ELV) devices (10*a-g*). An array of ELV devices (10*a-g*) is mounted on or adjacent to a backlight (11), employing a reflector (13) allowing for improved transmission. The backlight (11) may be partially diffusely reflective or translucent as to also allow for creation of a transflective display panel.

18 Claims, 4 Drawing Sheets

DISPLAY CAPABLE ELECTROWETTING LIGHT VALVE

CROSS-REFERENCE TO RELATED APPLICATIONS

This application claims the benefit of U.S. Provisional Application No. 60/586,555, filed on Jul. 9, 2004, the disclosure of which is hereby incorporated by reference herein in its entirety.

FIELD OF THE INVENTION

The present invention relates to flat panel display devices and, more specifically, to flat panel display devices that incorporate a high performance electrowetting light valve structure.

BACKGROUND OF THE INVENTION

Many technologies are currently being developed to provide the next generation of flat panel displays, projection displays, flexible displays, and micro-displays. Consumers consider flat-panel emissive displays, which emit light in a lambertian behavior, to be the most attractive type of display. Despite the human eye's natural affinity for such emissive displays, liquid crystal displays (LCD's) currently dominate the commercial display market. Because LCD's filter white light, which passes through polarizers, a perceptible variance in image quality is observed with view angle. Furthermore, the vast majority (approximately 90 percent or greater) of light in a LCD never reaches the viewer because of unavoidable absorption in thin film polarizers, color filters, and other optical losses in the LCD. Generally, polarizers transmit only about 40 percent of unpolarized incident light and color filters transmit only about 20 percent to about 30 percent of incident white light. Cold cathode fluorescent lamp (CCFL) backlights, which provide as much as 80 µm/W efficiency, generally result in an LCD efficiency of only a few lm/W.

Alternative flat panel display technologies, such as inorganic electroluminescent displays, organic electroluminescent displays, plasma display panels, and field emission displays, do not require either efficiency-reducing polarizers or heavy color filtering, as do LCD's. Regardless, even these alternative display technologies have comparable or lower efficiency to that of a LCD display panel. Moreover, the manufacture processes for conventional LCD's and these conventional alternative flat panel displays are highly complex.

Electrowetting has been a highly attractive modulation scheme for a variety of optical applications. For example, electrowetting has been used as an optical switch for fiber optics, as an optical shutter or filter for camera and guidance systems, in optical pickup devices, and in optical waveguide materials. Electrowetting has also found applicability in display applications, such as prismatic display devices and for using electrowetting of clear liquids. Electrowetting devices have also been developed for pixelation in emissive waveguide displays.

Opaque electrowetting liquids currently used in conventional reflective displays are severely limited in contrast. Polar colored electrowetting liquids have also been used in conventional transmissive electrowetting displays. However, such polar liquids are susceptible to rapid color-fading with extended light exposure during display operation. Conventional transmissive electrowetting displays are capable of increasing transmission efficiency using a reflector. However, conventional transmissive electrowetting displays suffer from parallax due to the reflector, and to eliminate parallax issues, the backlight must be directional, which severely limits the viewing angle.

A display-capable electrowetting light valve is needed that overcomes these and other deficiencies of conventional display devices.

SUMMARY OF THE INVENTION

In accordance with the principles of the invention, a backlight comprising a diffuse light guide, or other large area light source, provides white or colored light that impinges onto an optical light valve. When the optical light valve is in the 'OFF' state, it absorbs and/or reflects light back into the backlight. When the optical valve is in the 'ON' state, it transmits light with high-efficiency from the backlight to a viewer external to the display. Additionally, this optical valve may simultaneously and switchably reflect ambient light for high contrast use in bright environments. Various states of transmission are possible for an array of such optical valves allowing for gray-scale display operation.

According to the principles of this invention, electrowetting is used to control the light valve and forms a switchable display pixel. The electrowetting light valve (ELV) includes a black or colored non-polar liquid and a non-miscible optically transparent polar liquid in which the non-polar liquid is disposed. A plurality of two or more electrodes provide an electric field across these liquids or adjacent surfaces causing them to move via electrowetting principles. The liquid movement causes the display pixel to selectively switch between ON and OFF states of optical transmission. In an embodiment of the invention, the electrowetting light valve may include a reflective element partially positioned between the black or colored fluid and a supporting substrate. In another embodiment of the invention, the optical light valve may exhibit dual operation with or without a backlight by including a plate or film that is partially transmissive and partially reflective.

In one aspect, the display device of the present invention may operate as a high contrast color light valve without use of polarizers, color filters, or view angle enhancing films. In another aspect of the present invention, the display device is capable of more than reflective operation, therefore allowing high contrast operation. In yet another aspect of the present invention, the display device may be manufactured at a fraction of the cost of conventional flat panel display technologies because of its relatively simple construction.

Another aspect of the present invention is a transflective (a contraction of reflective/transmissive) display that may be viewed in bright ambient lighting or in complete darkness. Another aspect of the present invention is an electrowetting light valve for a display device that is transmissive when voltage is applied and should be able to utilize RGBW or field sequential color-schemes for highest efficiency operation. Yet another aspect of the present invention is an electrowetting light valve for a display device that allows for dual operation with, or without, a backlight by incorporating a plate or film that is partially transmissive and reflective. Furthermore, another aspect of the present invention is an electrowetting light valve for a display device that includes optical enhancement to eliminate nearly all light absorption in a fully bright or ON state. Another aspect of the present invention is an electrowetting light valve for a display device that is capable of high ON/OFF contrast.

In one embodiment of the invention a light-emitting device for a display includes a hydrophobic insulator, a plurality of electrodes, an amount of a first liquid separated from at least one of the electrodes by the hydrophobic insulator, and an amount of a second liquid disposed within the first liquid. The second liquid is movable relative to the first liquid. The second liquid has a lower light transmittance than the first liquid. The device further includes an illumination source adapted to generate light, an optical path extending through the electrodes, the second liquid, and the hydrophobic insulator, and a voltage source connected to the electrodes. The optical path is adapted to transmit light received from the illumination source. The voltage source is adapted to apply an electric field between the electrodes effective to move the second liquid relative to the first liquid to block at least a portion of the light from the illumination source from being transmitted through the optical path.

In another embodiment of the invention a light-emitting device for a display includes a hydrophobic insulator, a plurality of electrodes, an amount of a fluid separated from at least one of the electrodes by the hydrophobic insulator, an amount of a liquid disposed within the fluid, a voltage source connected to the electrodes, an illumination source adapted to generate light, and an optical path extending through the electrodes, the fluid, and the hydrophobic insulator. The liquid is movable relative to the fluid. The liquid has a greater refractive index than the fluid. The optical path is adapted to transmit light received from the illumination source and the voltage source is adapted to apply an electric field between the electrodes effective to move the liquid relative to the fluid. The movement of the liquid causes an optical phase shift that prevents at least a portion of the light from the illumination source from being transmitted through the optical path.

In another aspect of the invention, a method of operating a pixel in a flat panel display comprises transmitting light through an optical path in the pixel and moving an amount of a liquid relative to the optical path effective to change an intensity of the light transmitted through the optical path.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Although the invention will be described next in connection with certain embodiments, the description of the invention is intended to cover all alternatives, modification, and equivalent arrangements as may be included within the spirit and scope of the invention as defined by the appended claims. In particular, those skilled in the art will recognize that the components of the modulated electrowetting light-valve devices and displays described herein could be arranged in multiple different ways.

Figure 1A:
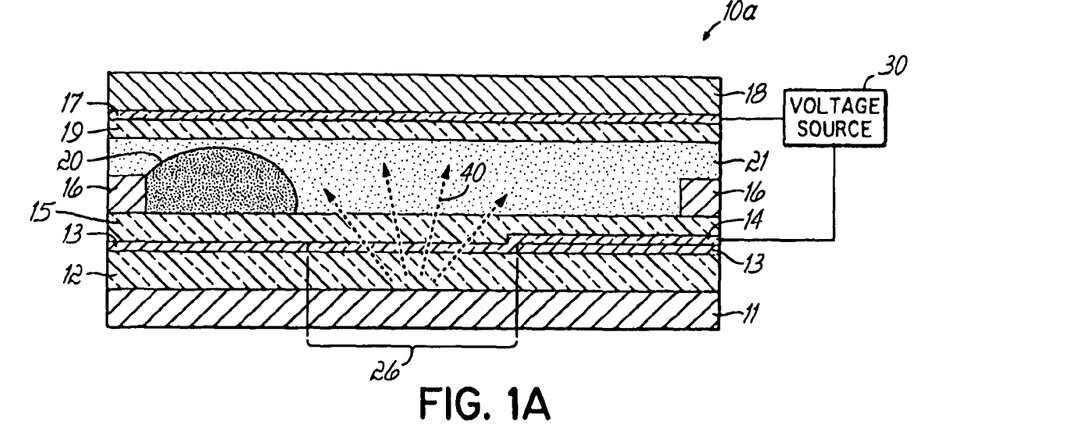
FIG. 1A is a cross-sectional view of an embodiment of an electrowetting light valve depicted in an optically bright ON state.
Figure 1B:
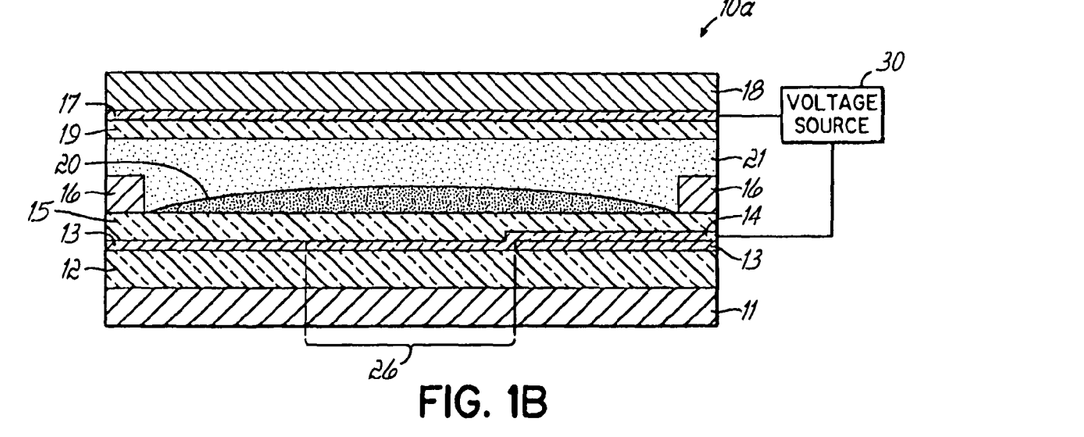
FIG. 1B is a cross-sectional view of the electrowetting light valve of FIG. 1A depicted in an optically dark OFF state.
Figure 1C:
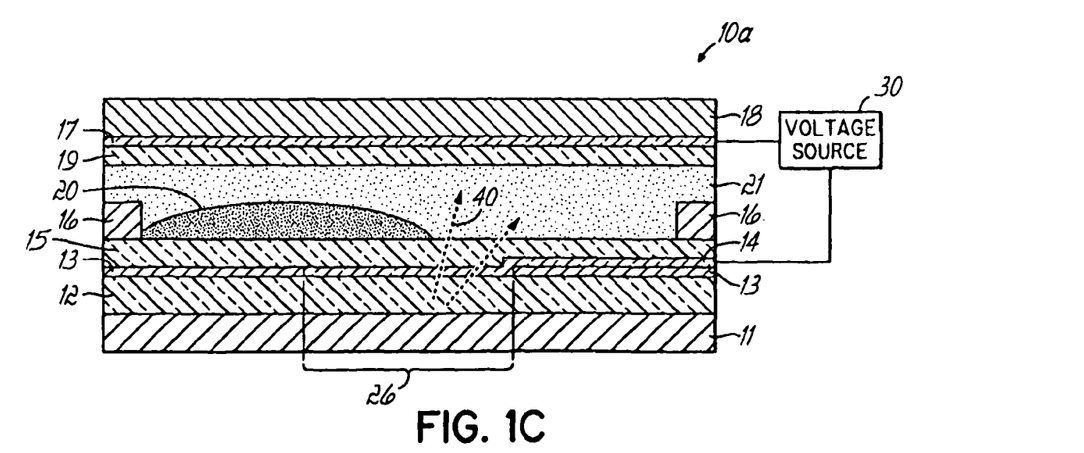
FIG. 1C is a cross-sectional view of the electrowetting light valve of FIG. 1A depicted in a partially bright gray-scale state.

With reference to FIGS. 1A-C, an electrowetting light valve (ELV) device 10a represents one, or one of a passively or actively addressed array, or segments, of multiple substantially identical ELV devices 10a constituting a display device (not shown). The display device, as understood by persons of ordinary skill in the art, incorporates multiple ELV devices 10a to form a light-emitting construction. A Cartesian coordinate system will be used to define specific directions and orientations, with the ELV device 10a being formed onto substrates defined in the x-y plane and light emission from the ELV device 10a traveling away from the device with at least a partial vector component in the z direction. References to terms such as 'above' and 'below' are for convenience of description only and represent only one possible frame of reference for describing the invention. The x-y dimensions of ELV device 10a preferably range from approximately 10 µm to approximately 10 cm based on the end display application but are not so limited in all possible forms of practice.

An array of ELV devices 10a is coupled with an illumination source or backlight 11, of which only a portion is shown in FIGS. 1A-C. The backlight 11 may be intimately coupled to the device 10a or exist as a stand-alone unit. The ELV device 10a is generally carried by a supporting substrate 12. The supporting substrate 12 may be chosen from rigid or flexible optically transparent or reflective materials including but not limited to glasses, polymers, metals, or crystals. The supporting substrate 12 is within suitable proximity of, or optically bonded to, the backlight 11 in an alternate embodiment of the invention, the supporting substrate 12 and backlight 11 may be combined into a single element. In an alternate embodiment the supporting substrate 12, or one or more additional films carried by the supporting substrate 12, may by fully or partially mirror, translucent, diffuse, iridescent, colored, or reflective in appearance.

Formed on the supporting substrate 12 is a reflector 13 that includes an aperture 26 through which light transmission through the ELV device 10a may occur. The area of this aperture 26 divided by the total area of each ELV device 10a, including spacing area between adjacent ELV devices 10a, is commonly termed as fill factor. The reflector 13 may include but is not limited to materials comprised of reflective metals, multi-layer inorganic or organic dielectric mirrors, white diffuse materials, refractive materials, prismatic materials, or combinations thereof. Reflector 13 has a thickness generally within, but not limited to, the range of 0.01 µm to 10 µm. As will be described below, the reflector 13 advantageously allows for improved switching speed, contrast, and efficiency for ELV devices 10a. However, the invention contemplates the construction of ELV devices 10a with, or without, the presence of the reflector 13.

With continued reference to FIGS. 1A-C, placed on or adjacent to the reflector 13 is a transparent electrode 14 that may be comprised of, but is not limited to, very thin metals, metal meshes, thin semiconductors, thin conducting polymers, thin transparent conducting oxides such as indium tin oxide (ITO), or combinations thereof. The transparent electrode 14 thickness is generally in the range of approximately 0.001 µm to approximately 10 µm. The transparent electrode 14 functions to provide voltage while additionally providing transparency to light. Although not shown, the reflector 13 may be electrically isolated from transparent electrode 14 by one more additional electrical insulating layers.

Carried by the transparent electrode 14 is a substantially hydrophobic insulator 15 at least partially covering one or more internally exposed solid surfaces of the ELV device 10. Materials suitable for hydrophobic insulator 15 include but are not limited to fluoropolymers such as TEFLON® AF (DuPont Corp.), Fluoropel (Cytonix Corp.), CYTOP® (Asahi Glass), or low surface energy polymers such as PARYLENE® (Cookson Inc.). Such hydrophobic materials suitably have a low surface energy of <35 dynes/cm and preferably <20 dynes/cm. Alternatively, hydrophobic insulator 15 may be constructed of a material with a surface energy of >35 dynes/cm, but this may degrade the performance of the ELV device 10a by increasing the switching OFF time. Yet another alternate embodiment of the present invention would be to use a hydrophobic insulator 15 with insufficiently high surface energy, but which includes a molecular monolayer at its surface that can increase hydrophobicity of the surface of insulator 15.

Hydrophobic insulator 15 may alternatively be internally comprised of solid layers or of dispersed or fused particles, the solid layers or particles comprised of one or more inorganic or organic dielectric materials such as but not limited to $SiO_2$, $Al_2O_3$, $BaTiO_3$, or Parylene, which are simply surface coated, permeated, or mixed with low surface energy polymers or fluoropolymers to achieve the desired hydrophobicity. The hydrophobic insulator 15 generally has a thickness of approximately 0.001 µm to approximately 10 µm. The hydrophobic insulator 15 may have a smooth, rough, patterned, or periodic texture to enhance its hydrophobic properties. The hydrophobic insulator 15 serves as low-surface energy surface that may be temporarily modified into a hydrophilic higher-surface energy surface when polarized by an external applied electric field.

Situated above the hydrophobic insulator 15 are an amount of a substantially black or colored liquid 20 and an amount of a substantially transparent liquid 21. The liquids 20 and 21 are not misicible with one another. Generally, a level of less than 10%, preferably less than 1%, of cross-solubility between the liquids is preferred. Liquid 20 has a lower light transmittance than liquid 21. Preferably, liquid 21 is highly transparent to light entering the ELV device whereas liquid 20 is highly opaque to light entering the ELV device. Neither, either, or both liquid 20 and liquid 21 may contact multiple or one of the surfaces of the sides, upper, or lower internal solid features of ELV device 10. It is understood that the specific representation of liquid placement in the Figures is solely for purposes of illustration and is not intended to be limiting of the invention.

Liquid 20 is a non-polar black or colored fluid that, due to its non-polar character, is believed to be advantageous for achieving an adequately long-lifetime ELV device 10a. It is further believed that using a non-polar black or colored liquid 20 alleviates light-induced color-fading in comparison with polar substances otherwise suitable for use as liquid 20. As understood by a person of ordinary skill in the art, a non-polar molecular substance like liquid 20 lacks concentrations of positive or negative electric charge. Non-polar liquid 20 may have a surface energy of <40 dynes/cm and, preferably, <25 dynes/cm. Substances suitable for use as non-polar liquid 20 include, but are not limited to, hydrocarbon liquids like alkanes, fluorocarbon liquids, silicone or siloxane liquids, non-polar solvents, and mixtures thereof. If the non-polar liquid 20 is not intrinsically black or colored, in order to render the non-polar liquid 20 black or colored, an exemplary but non-limiting approach is to dope the liquid 20 with non-polar anthraquinone or azo dyes.

Liquid 21, which is polar, may have a surface energy of >25 dynes/cm and, preferably, >40 dynes/cm. Substances suitable for use as polar liquid 21 include, but are not limited to, water, dimethyl-sulfoxide, and mixtures thereof. As understood by a person of ordinary skill in the art, polar molecular substances, like liquid 21, are virtually insoluble in non-polar molecular substances, like liquid 20.

For the ELV device 10a, given the polar character of the liquid 21 and the non-polar character of the liquid 20, without any external applied electric field to the hydrophobic insulator 15, liquid 20 naturally forms a liquid film over the hydrophobic surface of hydrophobic insulator 15. This is because of liquid-liquid and liquid-solid interfacial surface tension relationships. With application of electric field across the hydrophobic insulator 15, liquid 21, and/or liquid 20, liquid 21 is attracted toward the hydrophobic insulator 15 and, as liquid 21 moves, displaces liquid 20 in primarily the x-y directions.

The location, composition, and desired movement of liquids 20 and 21 are not limited to the specific examples given for this invention. Rather, any non-polar liquid 20 and polar liquid 21, and arrangement thereof, are suitable so long as liquids 20, 21 may be put in relative motion through electrowetting principles to satisfy the optical switching criteria within the spirit of the invention. Furthermore, liquid 20 need only be optically opaque at desired wavelengths of light. Furthermore, in alternative embodiments of the invention, liquid 20 may also be reflective white, or reflective metallic, or mirrored in appearance. Reflective white color for liquid 20 may be achieved by, but is not limited to, doping the liquid with pigment particles.

Generally, liquids 20 and 21 may each be in the range of approximately 0.1 µm to approximately 1000 µm in individual thickness, preferably in the range of approximately 1 µm to approximately 100 µm thickness. Generally, liquids 20 and 21 have, but are not limited to, suitable viscosity less than 100 centistokes (cSt) at device operating temperatures, and preferably less than 2 cSt. As well known by persons of ordinary skill in the art of electrowetting, the polar liquid 21 may also contain electrolyte for which non-limiting examples are NaCl, CaCl, KCl, and other compounds soluble in polar liquids. Viscosity, temperature variance, long-term stability, and other issues determining the merit of various liquids are well known by persons of ordinary skill in the art of electrowetting and applicable to the invention. Both, either, or neither liquid 20 or liquid 21 may include additional doping or mixtures of other soluble solid or liquid materials in order to modify their effective surface tension, optical properties, electrical properties, stability, viscosity, freezing or melting point, and/or doping/mixture acceptability.

With continued reference to FIGS. 1A-C, two substantially hydrophilic separators 16 flank the sides of the non-polar liquid 20. These hydrophilic separators 16 have a high surface energy that attracts the polar liquid 21. This effectively prevents the non-polar liquid 20 from escaping the individual ELV device 10a. Suitable hydrophilic materials for hydrophilic separator 16 include, but are not limited to, acrylics, nylon, polyester, metals, semiconductors, insulators, titanium based oxides, black paints or inks, color or white paints or inks, reflective paints or inks, and other materials that have high surface energy of >25 dynes/cm, preferably >35 dynes/cm. Suitable hydrophilic separator 16 thickness includes, but is not limited to, approximately 0.0001 µm to approximately 1000 µm. Alternately, the hydrophilic separator 16 need not be strongly hydrophilic, but may form a physical wall that physically isolates the liquids between adjacent ELV devices 10a. Alternately, the hydrophilic separator 16 may be a localized chemical, electrical, or physical modification of the surface of the hydrophobic dielectric 15 that increases the surface energy of the hydrophobic dielectric 15. Alternately, the hydrophilic separator 16 may be the localized absence of the hydrophobic dielectric 15 such that an adequately higher surface energy surface is then exposed.

A second transparent electrode 17 is provided above, or adjacent to, liquids 20, 21. This second transparent electrode 17 is electrically shorted or capacitively coupled to liquids 20, 21. This transparent electrode 17, which may be formed from the same constituent material(s) as electrode 14, serves as a counter electrode to transparent electrode 14. The transparent electrodes 14 and 17 are electrically coupled with a voltage source 30. The voltage source 30 may be a directly connected voltage source, thin-film transistor, a row or column electrode connected to driver circuitry, or combinations thereof which are well-known by those skilled in the art of displays. The voltage source 30 allows for application of an electric field across the liquid 20, liquid 21, and hydrophobic insulator 15. This application of electric field controls the switching of ELV device 10a, which will be described below. In an alternate embodiment of this invention, if adequately electrically conducting, the polar liquid 21 itself may serve as an electrode and be connected directly to the voltage source 30. In yet another alternate embodiment of the present invention, electrode 14 and electrode 17 may be modified in position or functionality, or additional electrodes may be included.

Generally, transparent electrode 17 will be carried by a sealing substrate 18. Like the supporting substrate 12, the sealing substrate 18 may be comprised of, but is not limited to, rigid glasses or flexible polymers.

One or more functional layers 19 may also be carried by the sealing substrate 18. This functional layer 19 may play several roles, including but not limited to, providing a hydrophobic, hydrophilic, and/or dielectric layer or combinations thereof. In a preferred embodiment, the functional layer 19 is simply a dielectric that allows for capacitive coupling of electrode 17 to liquids 20 and 21.

The transmission of the ELV device 10a may be understood with reference to FIGS. 1A-C. With no applied voltage to the ELV device 10a, the system of liquid 20 and liquid 21 will orient itself in the geometrical fashion shown in FIG. 1B. As shown in FIG. 1B, the liquid 20, which is non-polar, forms a continuous or covering film over all or part of the hydrophobic insulator 15. This configuration of the liquid system comprising liquid 20 and liquid 21 is given by the interfacial surface tension relationship between the polar liquid 21, non-polar liquid 20, and hydrophobic dielectric 15. This configuration in FIG. 1B is for an ELV device 10a in the 'OFF' state. In the OFF state the voltage source 30 supplies no voltage, or inadequate voltage, to the transparent electrodes 14 and 17 causing the geometrical configuration of the liquids to adequately block light emission from the backlight 11 through the aperture 26 in the reflector 13. In an alternate embodiment of the present invention, if any of the objects below the oil layer are reflective or semi-reflective, the OFF state corresponds to suppression of ambient light reflection from the ELV device 10. Such dual transmissive and reflective operation is often referred to as 'transflective' operation.

Referring back to FIG. 1A, the ELV device 10a may be turned into the 'ON' state by applying sufficient voltage from the voltage source 30 causing the liquid system to reorient itself. The liquid 20 is repelled from covering the aperture 26 in the reflector 13, causing light in an optical path generally indicated by single-headed arrows 40 from the backlight 11 to be transmitted through the ELV device 10a. The applied voltage from the voltage source 30 increases the electric field applied to the system, and causes the polar liquid 21 to attract to the hydrophobic insulator 15. Suitable applied voltages are in the range of but not limited to approximately 1 V to approximately 100 V, and preferably in the range of approximately 3 V to approximately 15 V. Suitable voltages also include modulation of approximately 1 V to approximately 100 V in addition to a fixed DC offset voltage of approximately 1 V to approximately 100 V.

As shown in FIG. 1C, intermediate switching states are possible when the voltage source 30 applies voltage adequate only to partially displace the liquid 20 covering the aperture 26 in the reflector 13. This allows the ELV device 10a to achieve gray-scale switching. Other various time domain, spatial dithering, and/or applied voltage methods of generating gray-scale, which are known by persons of ordinary skill in the art of displays, are also applicable to the ELV device 10a.

The role of the reflector 13 is now described and includes but is not held or limited to increasing optical transmission efficiency, increasing ON/OFF contrast, reducing operating voltage and power, and increasing device speed that further allows for high-efficiency red/green/blue field-sequential color for the ELV device 10a. The reflector 13 enhances the display in this way by reducing the required distance the liquid 20 must be moved by electrowetting in order to turn the ELV device 10a completely ON or completely OFF. The reflector 13 allows this reduction in aperture 26 by reflecting or recycling light incident on the reflector 13 back into the backlight 11 until light becomes incident upon the aperture 26. According to the principles of the present invention, the reflector 13 is typically situated adjacent to the liquid 20 with any separation being due to one or more thin films of total thickness <100 µm and preferably <10 µm.

The components described for FIGS. 1A-C comprise a basic set of elements of the present invention. However, these elements do not comprise a limiting set, and it is understood by persons of ordinary skill in the art of displays and electrowetting that multiple elements presently demonstrated in display and electrowetting devices may be additionally included in the invention.

Figure 2A:
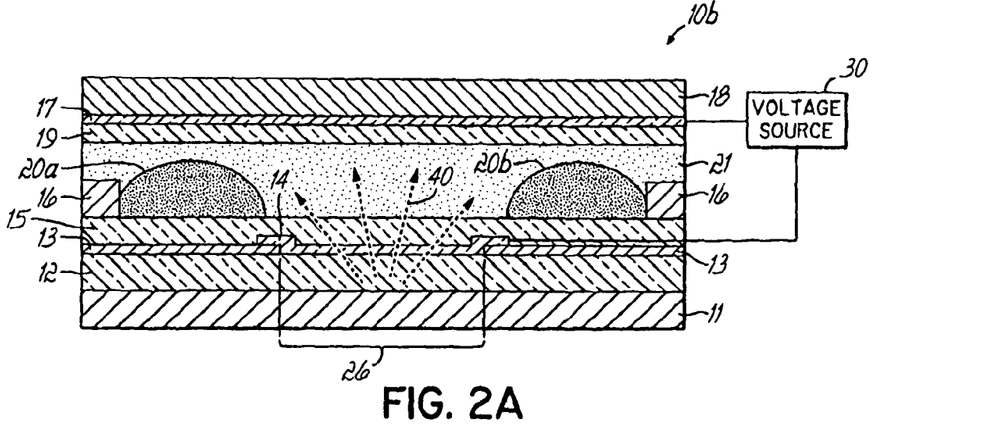
FIG. 2A is a cross-sectional view of an alternate embodiment of an electrowetting light valve depicted in an optically bright ON state.
Figure 2B:
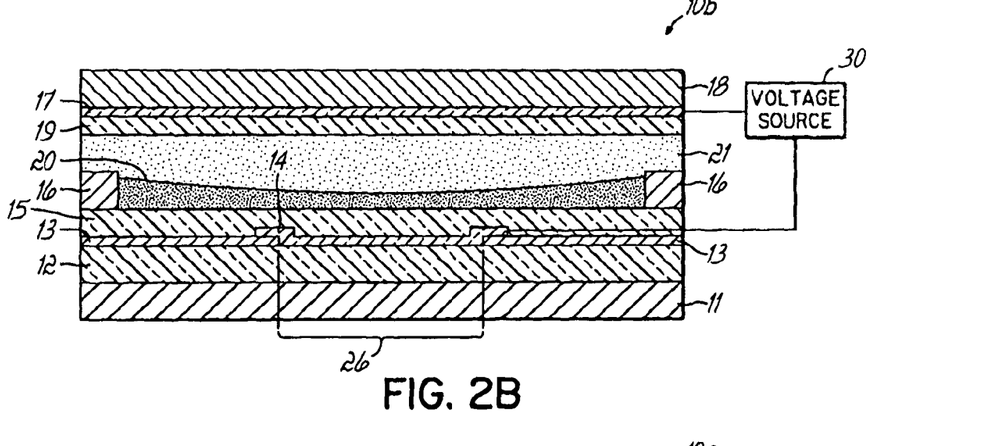
FIG. 2B is a cross-sectional view of the electrowetting light valve of FIG. 2A depicted in an optically dark OFF state.

As shown in FIG. 2A in which like reference numerals refer to like features in FIGS. 1A-C and in accordance with an alternative embodiment of the invention, an ELV device 10b utilizes one or more black or colored liquids 20a and 20b. These black or colored liquids 20a and 20b are separate for the ELV device 10b of FIG. 2A in the ON state. In the OFF state the voltage supplied by voltage source 30 is sufficiently reduced so that as shown in FIG. 2B, for an ELV device 10b, two or more black or colored liquids 20a and 20b combine to form one or more continuous films of liquid 20. Note, in FIG. 2B the shape of liquid 20 is concave instead of convex like that of the liquid 20 in FIG. 1B. An example black or colored liquid geometry is that in which liquids 20a and 20b represent the cross-section image of an annular (circular), rectangular, or other geometry ring of black or colored liquid. In alternate embodiments of the present invention, such as the ELV device 10b of FIG. 2B, the liquid 20 may take on any appropriate geometry with the only restraints being that that geometry is modified by electrowetting or by surface tensions and surface energies or geometries of various elements of the ELV devices 10b.

Figure 3:
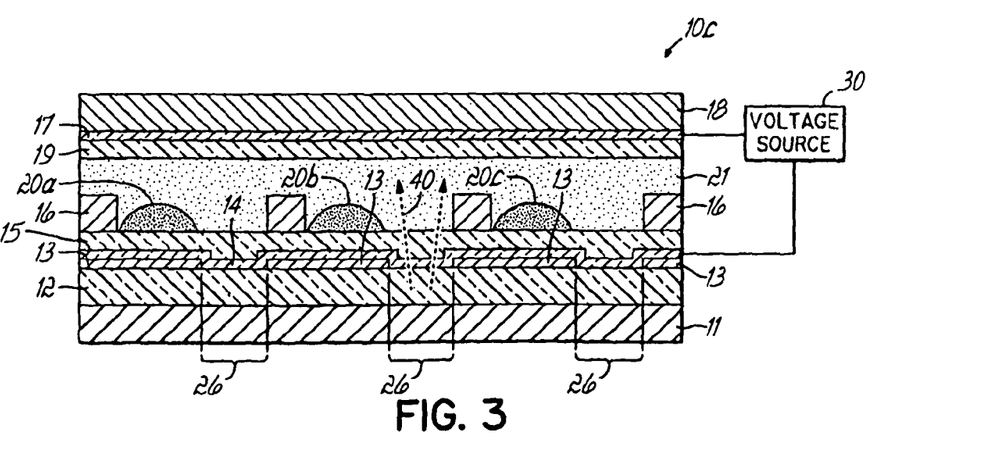
FIG. 3 is a cross-sectional view of an alternate embodiment of an electrowetting light valve depicted in an optically bright ON state.

As shown in FIG. 3 in which like reference numerals refer to like features in FIGS. 1A-C and FIGS. 2A,B, and in accordance with an alternative embodiment of the invention, an ELV device 10c in the ON state of this invention utilizes multiple registered apertures 26 defined by multiple reflectors 13, divided portions of black or colored liquids 20a, 20b, 20c, and multiple hydrophilic separators 16. This embodiment of the invention operates under the same physics of the ELV devices 10a and 10b, but offers several potential advantages. Each portion of liquid 20a, 20b, 20c, may improve switching speed by decreasing the total distance and mass of liquids that must be moved during ON/OFF switching. Alternately, this approach may allow for scale up of ELV device 10c size without loss in switching speed. Furthermore, this approach may allow an optically averaged, and therefore more repeatable, grayscale response of multiple moving portions of black or colored liquids 20a, 20b, 20c in a single pixel. This, in effect, may improve pixel yield and uniformity in manufacturing. For example, a 6×2 array of portions of black or colored liquids in a single ELV device 10c allows for one individual portion of black or colored liquid of a total of twelve portions of black or colored liquid to malfunction while still maintaining greater than 90% accuracy for the ON/OFF switching of the pixel. Using multiple portions of black or colored liquids, such as portions 20a, 20b, 20c, per pixel also has the effect of improving perceived fill factor, or reducing image pixelation, as observed macroscopically by the viewer of the display.

Figure 4:
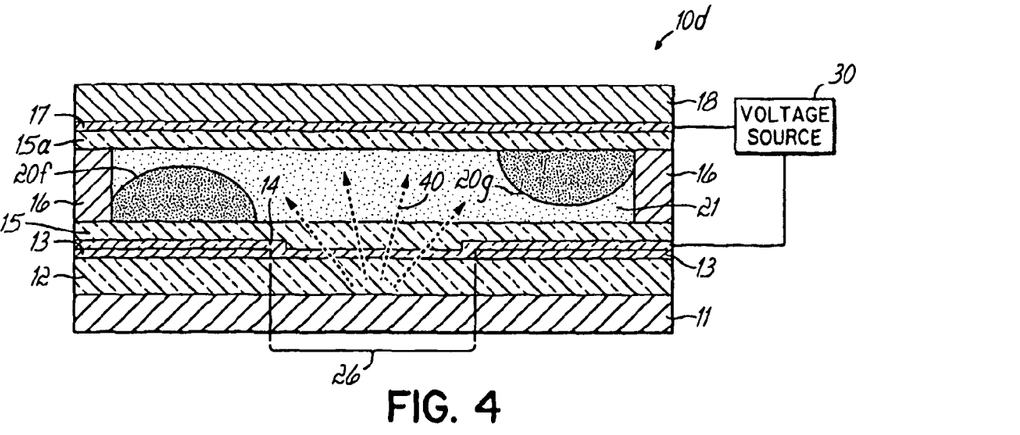
FIG. 4 is a cross-sectional view of an alternate embodiment of a double-layer electrowetting light valve depicted in an optically bright ON state.

With reference to FIG. 4 in which like reference numerals refer to like features in FIGS. 1-3, and in accordance with an alternative embodiment of the invention, ELV device 10d in the ON state includes opposing portions of liquid 20f and 20g that are both modulated over the common aperture 26 defined in the reflector 13. In order to achieve this arrangement, one portion of liquid 209 and an additional hydrophobic layer 15a, similar to hydrophobic layer 15, are additionally carried by the sealing substrate 18 and transparent electrode 17. Since both portions of liquid 20f and 20g advance/retreat over the same aperture 26 in reflector 13, switching time may be reduced compared to the device 10a of FIG. 1A and may be comparable to the switching time achieved for the device 10b of FIG. 2A. Furthermore, similar to reflective electrowetting based displays known by persons of ordinary skill in the art of electrowetting displays, a full color transmissive or transflective pixel may be achieved in this manner using cyan, magenta, and yellow filtering process instead of a black light absorbing process. Alternatively, in the ON state, the black or colored liquids 20f and 20g may reside on the same x-y side of the ELV device 10d but are not so limited.

Figure 5:
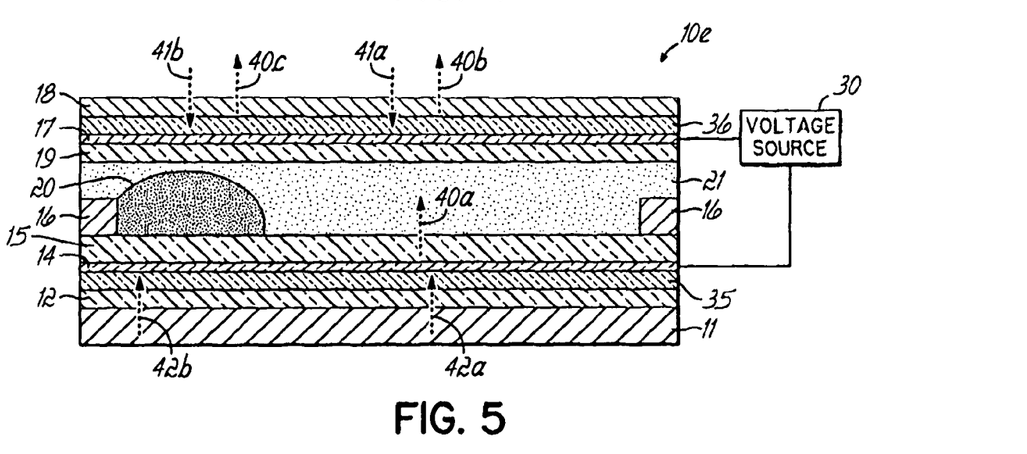
FIG. 5 is a cross-sectional view of an alternate embodiment of an electrowetting light valve depicted in an optically bright ON state.

With reference to FIG. 5 in which like reference numerals refer to like features in FIGS. 1 through 4, and in accordance with an alternative embodiment of the invention, ELV device 10e in the ON state includes addition of first optical layer 35 between or adjacent to substrate 12 and transparent electrode 14 and/or a second optical layer 36 between or adjacent to transparent electrode 17 and sealing substrate 18. Optical layer 35 is at least partially transmissive such that light, diagrammatically indicated by arrow 42a is transmitted through an optical path diagrammatically indicated by 40a,b to a viewer of device 10e. It should be noted that the optical path 40a,b is schematic and representative of sub-regions or areas of ELV device 10e.

In an alternate transflective embodiment of the present invention, optical layer 35 is partially optically reflective such that ambient light, diagrammatically indicated by single-headed arrow 41a, reflects off optical layer 35 and exits the ELV device 10e as reflected light, which is diagrammatically indicated by arrow 40b. A non-limiting example of partially diffusely reflective material for optical layer 35 include $TiO_2$ powder dispersed in a lower refractive index polymer such as TEFLON® or poly-methyl-methacrylate.

In an alternate embodiment of the present invention, optical layer 35 has optical refractive capability such that light generally indicated by arrow 42b originating from backlight 11 is focused away from incidence on the liquid 20 and exits the ELV device 10e through optical path 40a,b. Non-limiting examples of such a refractive optical layer 35 includes an optical lens element, a prismatic structure, or a light pipe structure manufactured from optically transparent materials.

In an alternate embodiment of the present invention where the ELV device 10e is reflective or transflective in operation, optical layer 36 has optical refractive or reflective capability such that ambient light 41b is focused away from incidence on the liquid 20 and reflected by optical layer 35, or another reflective layer, and exits the ELV device. Non-limiting examples of such a refractive optical layer 36 includes an optical lens element, a prismatic structure, or a light pipe structure manufactured from optically transparent materials.

In an alternate embodiment of the present invention where the ELV device 10e is transmissive, transflective, or reflective in operation, optical layer 36 has optically refractive, or diffusive capability such that ambient light 40a is spread to emerge near both arrow 40b and 40c, or from the entire ELV device area 10e. Non-limiting examples of such a refractive optical layer 36 includes an optical lens element, a prismatic structure, an optically diffuse material, or a light pipe structure manufactured from optically transparent materials.

The above described functionality for the optical layer 36 allows a reflective ELV device 10e of the present invention to significantly exceed the contrast limitations of conventional ELV devices. The optical layer 36 of ELV device 10e is capable of providing an ON/OFF contrast ratio of greater than or equal to 100:1, which is sufficient for display of high quality still images or video.

Regarding alternate embodiments of the present invention utilizing multiple, both or one of optical layer 35 and optical layer 36, any arrangement of such optical layers is allowed to achieve the above-defined functionality. Therefore, multiple locations, arrangements, geometries, and compositions are possible and the specific arrangements of said optical layers for the ELV device 10e does not represent a limiting set. Furthermore, the functionality of the optical layers may be combined with the functionality of other elements of the ELV device 10e. A non-limiting example would be a hydrophobic dielectric 15 that also serves as a partially diffusely reflective element by incorporating $TiO_2$ powder dispersed in a lower refractive index polymer such as TEFLON® AF. Furthermore, noting that optical layer 35 may be partially, weakly, or completely non-reflective, the backlight 11 may receive ambient light 41a, 41b, recycle the light, and redirect the light to exit the ELV device 10e or at other ELV devices 10e that share a common backlight 11. Furthermore, the reflector 13 described for ELV devices 10a-d of FIGS. 1-4 may be partially incorporated in, near, or adjacent to both, either, or neither optical layer 35 and optical layer 36. The general but non-limiting intention of incorporating reflector 13, optical layer 35, and optical layer 36, is to improve the transmission, reflection, contrast, switching speed, drive voltage, or other performance of the ELV devices 10e. Any useful combination or arrangement of reflector 13, optical layer 35, and optical layer 36 are permitted under the spirit and intention of the present invention.

Figure 6:
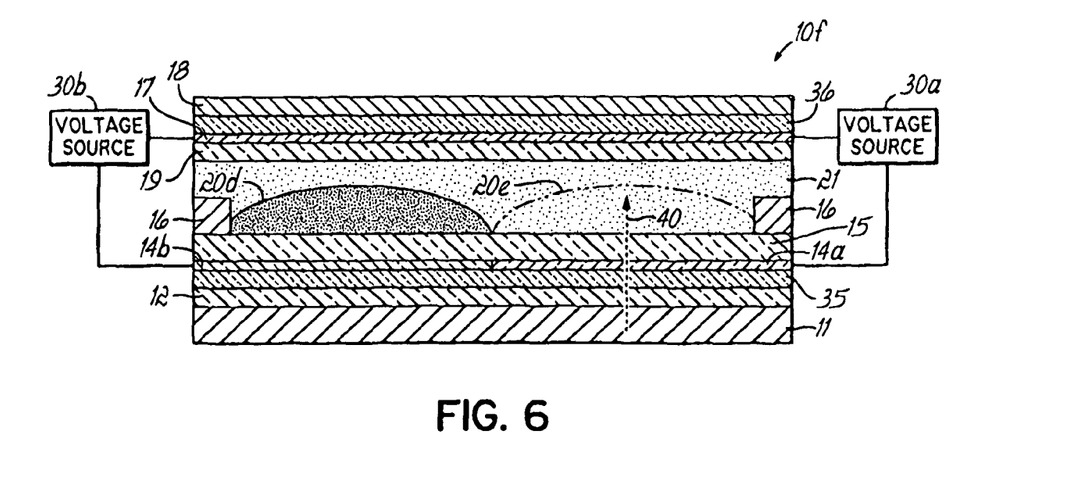
FIG. 6 is a cross-sectional view of an alternate embodiment of a bistable electrowetting light valve depicted in an optically bright ON state.

With reference to FIG. 6 in which like reference numerals refer to like features in FIGS. 1-5, and in accordance with an alternative embodiment of the present invention, ELV device 10f in the ON state is capable of bi-stable operation. Bistable operation allows the ELV device 10f to be held in the ON state, the OFF state, or any gray-scale state, without continuous application of voltage. A first transparent electrode 14a is electrically coupled to a first voltage source 30a. A second reflective electrode 14b is electrically coupled to a second voltage source 30b. In the configuration shown in FIG. 6, no applied voltage need be applied to either electrode 14a or electrode 14b to maintain the ELV device 10f in the ON state as indicated by position of liquid 20d and transmission of light through optical path 40. The ELV device 10f may be switched to the OFF state by momentarily using voltage source 30b to place sufficient voltage on electrode 14b such that liquid 20d moves to the position indicated by dotted lines 20e. The ELV device 10f may be switched back to the ON state by momentarily using voltage source 30a to place sufficient voltage on electrode 14a such that position of black or colored liquid indicated by dotted lines 20e moves back to the position indicated by liquid 20d. Various voltage techniques, such as differential voltage or by modulating the duration of time that voltage is momentarily applied to either electrode 14a or electrode 14b, may be utilized to achieve gray-scale switching states that allow partial transmission or reflection. For the ELV device 10f of FIG. 6, like performance, features, and functionality described for FIGS. 1-5 are also incorporated within the spirit of this alternate embodiment of the present invention.

Figure 7A:
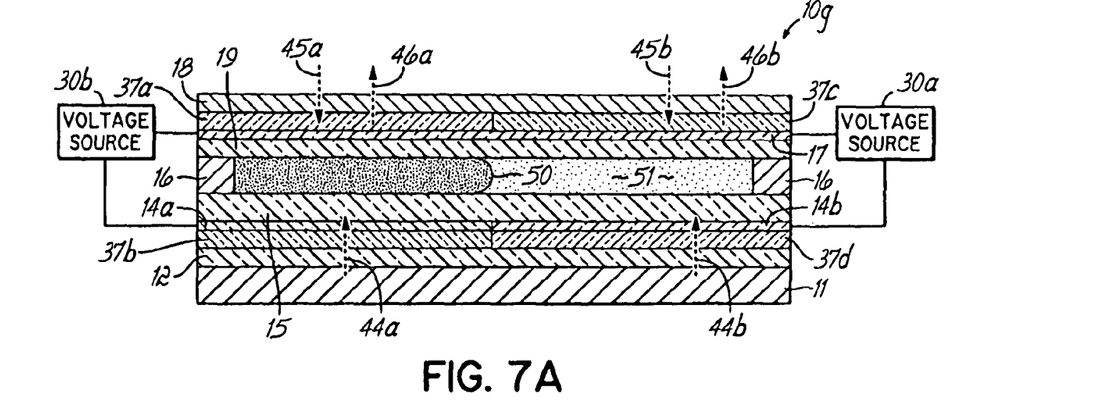
FIG. 7A is a cross-sectional view of an alternate embodiment of an electrowetting light valve depicted in an optically bright ON state.
Figure 7B:
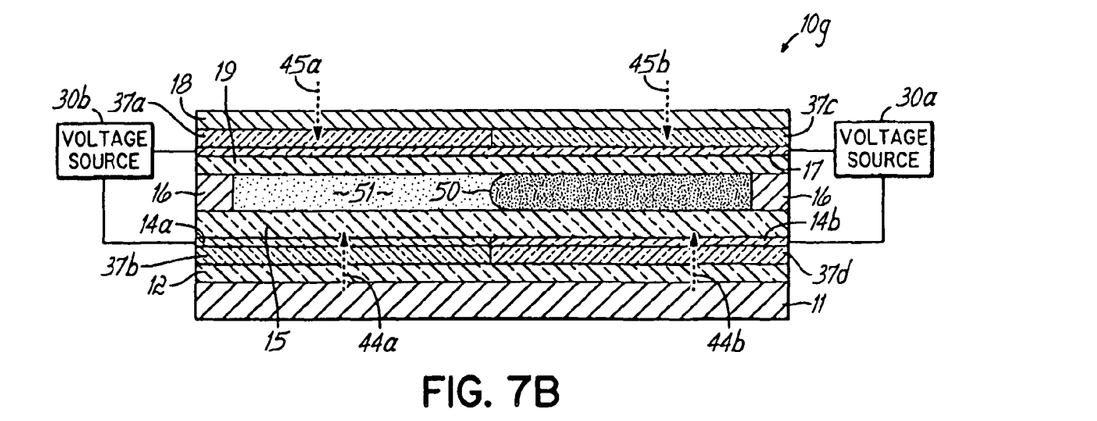
FIG. 7B is a cross-sectional view of an alternate embodiment of an electrowetting light valve depicted in an optically dark OFF state.

With reference to FIGS. 7A,B in which like reference numerals refer to like features in FIGS. 1-6 and in accordance with an alternative embodiment of the invention, an ELV device 10g is capable of interference modulated reflective, transflective, or transmissive operation. Interference modulated operation of a light valve using micro-electro-mechanical-system (MEM's) membranes is described in U.S. Pat. Nos. 5,835,255, 6,650,455, and Miles et al., "Digital Paper™ for reflective displays", Journal of the SID, 11/1, p. 209-215, 2003.

In this alternate embodiment of the present invention, the movable MEMs reflector utilized in an interference-modulated structure is replaced with a liquid that is movable via electrowetting. In this alternate embodiment of the present invention, one or more liquids may be moved in or out of the optical path of light as to cause a phase delay of the light due to the difference in refractive index of the liquid and refractive index in absence of the liquid. This alternate embodiment of the present invention utilizes two complimentary interference modulated elements in the ELV device 10g. The first interference modulated element consists of optical element 37a and/or optical element 37b. The second interference modulated element consists of optical element 37c and/or optical element 37d. As shown in FIG. 7A, two optical elements 37 may be utilized for each interference modulated element with alternate embodiments of the present invention limited only to the range of one or multiple optical elements 37 per interference-modulated element. As shown in the FIG. 7A, a sufficiently transparent liquid 50 with high refractive index causes a phase delay in incident ambient light diagrammatically indicated by arrow 45a, or transmitted light in an optical path through ELV device 10g diagrammatically indicated by arrows 44a, 46a, such that constructive interference or lack of absorption in optical elements 37a and optical element 37b allows light to exit the ELV device 10g.

As shown in the FIG. 7A, a sufficiently transparent liquid 51 with low refractive index causes a phase delay in incident ambient light diagrammatically indicated by arrow 45b, or transmitted light in an optical path through ELV device 10g diagrammatically indicated by arrows 44b, 46b, such that constructive interference or lack of absorption in optical element 37c and optical element 37d allows light to exit the ELV device 10g. This configuration of FIG. 7A corresponds to an ELV device 10g in the fully ON or optically bright state.

In FIG. 7B, the high refractive index liquid 50 and low refractive index liquid 51 are switched in position, in comparison to their respective positions depicted in FIG. 7A, via electrowetting by application of appropriate voltage between electrode 17 and electrode 14a or electrode 14b. Proper operation of ELV device 10g further requires that liquid 50 and liquid 51 are opposite in terms of polar or non-polar surface tension so they are not miscible. Proper to the geometries of liquid shown in FIGS. 7A,B, liquid 50 is polar, but this is not limiting within the scope of the present invention. With liquid 50 and liquid 51 switched in position, a new phase shift is induced for each interference modulated element. With low refractive index liquid 51 now in the optical path of optical element 37a and optical element 37b, destructive interference or absorption prevents light from exiting that area of the ELV device 10g. With high refractive index liquid 50 now in the portion of the optical path 44b, 45b including optical element 37c and optical element 37d, destructive interference or absorption prevents light from exiting that area of the ELV device 10g. Intermediate grayscale states are achieved by placing the high refractive index liquid 50 near the horizontal (x-y) center of the ELV device 10g. Destructive interface or absorption is capable of providing transmissive, refractive, or transflective operation for the ELV device 10g.

In alternate embodiments of the present invention, the low refractive index liquid 51 may be replaced by a gas with refractive index approximately 1.0. Suitable but non-limiting refractive indices for the high refractive index liquid are approximately 1.3 to approximately 2.4 for which non-limiting examples include aromatic solvents, silicone liquids, dimethylsulfoxide, diiodomethane, or water doped with soluble solid material. Suitable but non-limiting refractive indices for the low refractive index liquid are approximately 1.25 to approximately 1.5 for which non-limiting examples include alkane liquids, silicone liquids, fluorinated liquids, and water. Optical elements 37 may be fabricated from one or more stacked thin films of glasses, polymers, metals, semiconductors, or crystals, with non-limiting examples including $SiO_2$, SiN, Si, C, $TiO_2$, TEFLON® AF, MgF, Al, Ag, and $In_2O_3$:$SnO_2$. Thicknesses of optical elements 37 are generally on the order of fractions or multiples of the wavelength of visible light (approximately 0.1 to approximately 10 μm) but are not necessarily so limited. Alternately, either liquid 50 or liquid 51 may be black or colored such that it absorbs light at optical maximum in the interferometric elements of the ELV device 10g. Alternate designs, materials, configurations, and methods of operation are obvious to those skilled in the art of optics and more specifically those skilled in the art of thin-film interference structures and optical microcavities, and are included in alternate embodiments within the spirit of the present invention.

Alternate embodiments of the present invention applicable to all Figures are herein discussed within the spirit of the present invention. Although the majority of description herein pertains to use of ELV devices 10a-g in displays, alternate non-display applications for ELV spatial light modulators obvious to those skilled in the art of spatial light modulators are within the spirit of the present invention. Various forms of electrowetting and electrode schemes are applicable to the present invention as described by Pollack et al, "Electrowetting-based actuation of droplets for integrated microfluidics", Lab on Chip Vol. 2, p. 96-101, 2002.

Electrode, dielectric, and other layers and materials of the present invention may be continuous, perforated, shaped, textured, or of any physical geometry that supports the functionality of the ELV devices 10a-g of the present invention. Two, three, or numerous separate electrodes and voltage sources are possible for each ELV device 10a-g. Voltage sources may applied DC or AC waveforms, or any waveform super-imposed on a DC or AC waveform. One example of which is boost-phase or over-drive waveforms common to drive schemes for liquid crystal displays.

The viewer or observer of the ELV device 10a-g may observe the ELV device from either the top or bottom so long as components such as the backlight 11 are properly configured to allow such operation. Electrode and reflector 13 geometries may have circular, wedge, or other shapes, to enhance creation of multiple grayscale states with application of voltage. Films and surfaces of the ELV devices 10a-g of the present invention may have spatially varying thickness, capacitance, textures, grooves, or irregularities to assist in grayscale switching or to prevent fluids from sticking to surfaces or from exhibiting hysteretic switching behavior. Alternately, for some drive schemes such as passive-matrix drive, modification of the ELV devices 10a-g for strongly hysteretic switching behavior may be desired. Common display enhancement films may be applied to any surface or included in any location as to further improve or modify the performance of the ELV devices 10a-g.

Liquid arrangements may vary as described by Heikenfeld and Steckl, "Electrowetting Light Valves with Greater than 80% Transmission, Unlimited View Angle, and Video Response," Proc. of the Soc. for Inf. Displays, Book II, pp. 1674-1677, 2005, and references therein. Multiple adjacent apertures 26 are implementable within a single ELV device 10a-g such that discrete levels of gray-scale response are thereby voltage-separated.

Highly specific backlight designs are not discussed herein because the ELV device 10a-g is readily compatible with backlight schemes known by those skilled in the art of liquid crystal displays. Backlight 11 and ELV device 10a-g may be rigid, flexible, foldable, rollable, shaped, or deformable, in one or more directions. Backlight 11 may also have a mirror, with a translucent, or diffuse, or other reflective appearance such that ELV devices 10a-g described herein may additionally operate as a transflective display devices by reflecting ambient light incident upon the display. Backlight 11 may be direct or edge-lit, and standard white.

Standard color-filter designs may be added to ELV devices 10 so that single-, multi-, or full-color displays or pixels may be created from an ELV devices 10 using a simple white backlight 11. Color filters may be aligned with ELV devices 10 in a color-complimentary fashion. For example, a red-colored liquid 20 may be used in conjunction with a blue color filter to achieve an ELV device 10a-g that may switch between a black OFF state and a blue ON state. Using this color-complimentary eliminates the difficulties and challenges in creating a completely opaque liquid 20. Aperture 26 or reflector 13 may be spectrally featureless or comprise specific color filtering or color reflecting capabilities. Of particular interest is color-reflecting (and therefore color recycling) capability for a thin-film interference stack put in place of aperture 26. Any color-filter arrangement may be used including red/green/blue, cyan/magenta/yellow, additional white pixels, or combinations thereof. Some or all color filters may be eliminated using red/green/blue field-sequential backlights or colored-backlights. Similar to some reflective LCD formats, fluorescent materials may be included to enhance reflectivity.

Backlight 11 may consist of an array of red, green, blue, or white light emitters such as electroluminescent, light emitting diode, plasma devices. The backlight 11 is then aligned with ELV devices 10a-g such that little or no optical filtering is required. Backlight 11 designs also include fiber-optic based designs and powder electroluminescent films.

Further embodiments of the present invention also include variations of the backlights and associated optics used for projection based displays, allowing the ELV device 10a-g of this invention to be used as a transmissive or reflective light engine in a projection display system. Using a transparent waveguiding backlight 11, the ELV device 10a-g may be viewed or observed through the backlight 11 in a front-illumination scheme well known for use in reflective based LCD's. This front-illumination scheme requires existing surfaces or films, or addition of surfaces or films of the ELV device 10a-g, that optically redirect light toward the viewer through refraction, reflection, diffuse reflection, or other technique. This embodiment, and according to other embodiments of the present invention, allow both, either, or neither of the electrodes 14 and 17 to be reflective, opaque, or partially transparent. The backlight 11 may be Lambertian such that the ELV devices 10a-g provide a wide viewing angle. Conversely, the backlight 11 may be made directional for privacy concerns or to increase brightness using approaches or products such as those provided by Minnesota Mining and Manufacturing Co. (3M) Vikuity products.

The following examples and comparative example illustrate particular properties and advantages of some of the embodiments of the present invention.

EXAMPLE 1

ELV devices were fabricated on Corning 1737 glass substrates. A lower patterned ground electrode consists of an approximately 50 nm 90%/10% $In_2O_3/SnO_2$ (ITO) film that is transparent (>90%) and electrically conducting (<40 ohm/sq.). DuPont TEFLON® AF 2400 amorphous fluoropolymer is then dissolved at approximately 1 wt. % in fluorosolvent (3M Corp. FC-75 FLUORINERT®) and dip-coated onto the ITO/glass substrate. After an approximately 15 minute baking and annealing cycle, the fluoropolymer forms a transparent <1 μm thick dielectric film with a surface energy of <20 dynes/cm (hydrophobic). Next, a hydrophilic grid (approximately 40 dynes/cm) is optically patterned from a photocurable acrylic resist that is resistant to dissolving or swelling in oils and cleaning solvents. The hydrophilic grid lines are approximately 150 μm wide, approximately 40 μm thick, and define an ELV cell that is approximately 1×1 $mm^2$ in area. A few hundreds of microliters (μL) of deionized water are then dosed over arrays of ELV cells. Next, approximately 10's to approximately 100's nanoliters (nL) of black-dodecane oil is inserted into each ELV cell, forming an oil layer thickness of 10's of μm. The dodecane oil has a surface tension of approximately 25 dynes/cm, causing it to form a continuous film positioned between the water (approximately 73 dynes/cm) and the hydrophobic dielectric (<20 dynes/cm). The oil is further confined laterally by the hydrophilic grid that strongly attracts, and is wetted by, the overlying water layer.

The oil is rendered opaque through approximately 1 percent by weight (wt. %) doping with red, yellow, and blue colored chromophores. The chromophores are nonpolar organic compounds that are soluble in the non-polar oil and that strongly absorb visible light without radiative decay. An electroded top glass plate is then placed over the ELV devices. For transmissive operation, a diffuse light-guide (backlight) is placed underneath the ELV array. The light-guide is edge lit with a white-phosphor-converted InGaN light emitting diode (LED) array.

The ELV's were tested and found to exhibit 20:1 ON/OFF contrast, 20 ms switching speed, and a maximum of 55% transmission.

EXAMPLE 2

The ELV devices of Example 1 were modified by inclusion of an Al reflector with an aperture placed between the glass substrate and transparent electrode. The ELV devices were tested and found to exhibit 60:1 ON/OFF contrast, 10 ms switching speed, and a maximum of 85% transmission.

EXAMPLE 3

The ELV devices of Example 1 were modified by inclusion of a diffusely reflecting and partially transmitting DuPont Luxprint™ dielectric between the hydrophobic dielectric and the transparent electrode. The ELV devices were tested and found to be legible in both dark lighting due the backlight and in 100,000 lux bright sunlight due to reflection from the partially reflective diffuse dielectric.

COMPARATIVE EXAMPLE 1

An attempt was made to utilize a black polar liquid and transparent non-polar liquid. It was found that the chromophore doping in the polar liquid caused a significant increase in electrical conductivity and caused electrical failure in the device. It was further found that the chormophores were easily photo-bleached upon extended exposure to light from the backlight. It was concluded that for long—is black or colored by doping with chromophores.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, multiple combinations of black or transparent, polar or non-polar liquids, multiple electrodes, hydrophobic and hydrophilic layers and separators, reflectors, transparent or reflective electrodes, color filters, spacers, optical elements, backlights, substrates, and other components known by those skilled in the art of displays and electrowetting may be included in various combinations within the spirit of this invention. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A light-emitting device for a display, comprising:
an insulator;
a plurality of electrodes;
an amount of a first liquid separated from at least one of said electrodes by said insulator;
an amount of a second liquid disposed within said first liquid, said second liquid movable relative to said first liquid, and said second liquid having a lower light transmittance than said first liquid;
an illumination source adapted to generate light;
an optical path extending through said second liquid and said insulator, said optical path adapted to transmit light received from said illumination source; and
a voltage source connected to said electrodes, said voltage source adapted to apply an electric field between said electrodes effective to move said second liquid relative to said first liquid to block at least a portion of the light from said illumination source from being transmitted through said optical path.

2. The light-emitting device of claim 1 further comprising:
a reflective layer with an aperture positioned in said optical path, said aperture operative to transmit the light from said illumination source to said optical path, and portions of said reflective layer adjacent to said aperture operative to reflect the light from said illumination source in a direction back toward said illumination source.

3. The light-emitting device of claim 1 further comprising:
an optical layer positioned in said optical path, said optical layer operative to transmit the light from said illumination source to said optical path, and said optical layer operative to reflect external ambient light incident upon said device.

4. The light-emitting device of claim 1 further comprising:
a focusing optical layer positioned in said optical path, said focusing optical layer operative to direct the light from said illumination source around said second liquid when a potential is applied to said electrodes effective to transmit light through said optical path.

5. The light-emitting device of claim 4 further comprising:
a reflective layer positioned in said optical path, said reflective layer operative to reflect external ambient light incident upon said device.

6. The light-emitting device of claim 1 wherein said first liquid is polar, said second liquid is non-polar, and said first and second liquids are non-miscible.

7. The light-emitting device of claim 1 wherein said first liquid is substantially transparent and said second liquid is substantially opaque.

8. The light-emitting device of claim 7 wherein said first liquid is transparent and said second liquid is black or colored.

9. The light-emitting device of claim 1 further comprising:
first and second separators flanking said first and second liquids, the first and second separators being substantially hydrophilic for confining said first and second liquids between said electrodes.

10. A light-emitting device for a display, comprising:
an insulator;
a plurality of electrodes;
an amount of a fluid separated from at least one of said electrodes by said insulator;
an amount of a liquid disposed within said fluid, said liquid movable relative to said fluid, said liquid and said fluid being confined between said electrodes, and said liquid having a greater refractive index than said fluid;

an illumination source;

an optical path extending through said-fluid, said liquid, and said insulator, said optical path adapted to transmit light received from said illumination source; and a voltage source connected to said electrodes, said voltage source adapted to apply an electric field between said electrodes effective to move said liquid relative to said fluid and thereby cause an optical phase shift that prevents at least a portion of the light from said illumination source from being transmitted through said optical path.

11. The light-emitting device of claim 10 wherein said fluid is a gas.

12. A method of operating a pixel in a flat panel display, comprising:

transmitting light through an optical path in the pixel; and moving an amount of a liquid relative to the optical path effective to change an intensity of the transmitted light through the optical path.

13. The method of claim 12 wherein moving the amount of the liquid further comprises:

applying a first electric field effective to displace the amount of the liquid relative the optical path to provide a first intensity of the transmitted light through the optical path; and applying a second electric field effective to displace the amount of the liquid relative to the optical path to provide a second intensity of the transmitted light through the optical path differing from the first percentage.

14. The method of claim 12 wherein moving the amount of the liquid further comprises:

applying an electric field effective to move the amount of the liquid relative the optical path.

15. The method of claim 14 wherein applying the electric field further comprises:

causing an optical phase shift with the amount of the liquid that changes the intensity of the transmitted light.

16. The method of claim 14 wherein applying the electric field further comprises:

displacing the liquid to block at least a portion of the optical path to change the intensity of the transmitted light.

17. A light-emitting device for a display, comprising:

an insulator;

a plurality of electrodes;

an amount of a first liquid separated from at least one of said electrodes by said insulator;

an amount of a second liquid disposed within said first liquid, said first liquid and said second liquid movable relative to each other, and said second liquid having a lower light transmittance than said first liquid;

an illumination source adapted to generate light;

an optical path extending through said second liquid and said insulator, said optical path adapted to transmit light received from said illumination source; and a voltage source connected to said electrodes, said voltage source adapted to apply an electric field between said electrodes effective to move said first liquid and said second liquid relative to each other to block at least a portion of the light from said illumination source from being transmitted through said optical path.

18. The light-emitting device of claim 17 further comprising:

a reflective layer with an aperture positioned in said optical path, said aperture operative to transmit the light from said illumination source to said optical path, and portions of said reflective layer adjacent to said aperture operative to reflect the light from said illumination source in a direction back toward said illumination source.

* * * * *

UNITED STATES PATENT AND TRADEMARK OFFICE
CERTIFICATE OF CORRECTION

| | | |
|---|---|---|
| PATENT NO. | : 7,872,790 B2 | Page 1 of 1 |
| APPLICATION NO. | : 11/570920 | |
| DATED | : January 18, 2011 | |
| INVENTOR(S) | : Andrew J. Steckl et al. | |

It is certified that error appears in the above-identified patent and that said Letters Patent is hereby corrected as shown below:

In column 14, line 31, after "transparent", insert a new paragraph indent.

In column 15, line 46, after "long-", insert --life display applications it is advantageous that the non-polar liquid be the one which--.

In column 17:
Line 2, claim 10, change "said-fluid" to --said fluid--
Line 23, claim 13, after "relative", insert --to--
Line 33, claim 14, after "relative", insert --to--.

Signed and Sealed this
Third Day of May, 2011

David J. Kappos
*Director of the United States Patent and Trademark Office*